(12) United States Patent
Mabuchi

(10) Patent No.: US 8,619,170 B2
(45) Date of Patent: Dec. 31, 2013

(54) SOLID-STATE IMAGE PICKUP DEVICE WITH PLURAL TRANSFER STRUCTURES TO TRANSFER CHARGE TO PLURAL ACCUMULATION PORTIONS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 12/849,071

(22) Filed: Aug. 3, 2010

(65) Prior Publication Data

US 2011/0032403 A1    Feb. 10, 2011

(30) Foreign Application Priority Data

Aug. 10, 2009   (JP) .................................. 2009-185534

(51) Int. Cl.
*H04N 5/335* (2011.01)
(52) U.S. Cl.
USPC ............ 348/296; 348/294; 348/302; 348/320
(58) Field of Classification Search
USPC .............. 348/320–322, 250, 230.1, 294, 296; 257/359
See application file for complete search history.

(56) References Cited

U.S. PATENT DOCUMENTS

| | | | |
|---|---|---|---|
| 6,919,551 B2* | 7/2005 | Barna et al. ................ | 250/214 R |
| 2002/0051067 A1* | 5/2002 | Henderson et al. ........... | 348/241 |
| 2003/0136980 A1* | 7/2003 | Lin ............................... | 257/215 |
| 2004/0135064 A1* | 7/2004 | Mabuchi ..................... | 250/208.1 |
| 2004/0189845 A1* | 9/2004 | Kasuga et al. ................ | 348/308 |
| 2004/0212723 A1* | 10/2004 | Lin ............................... | 348/362 |
| 2005/0110093 A1* | 5/2005 | Altice et al. .................. | 257/359 |
| 2005/0128324 A1* | 6/2005 | Kishi et al. .................... | 348/294 |
| 2005/0219884 A1* | 10/2005 | Manabe et al. ................ | 365/10 |
| 2006/0055576 A1* | 3/2006 | Boemler ...................... | 341/155 |
| 2006/0231732 A1* | 10/2006 | Yan ............................. | 250/208.1 |
| 2009/0040351 A1* | 2/2009 | Cho ............................ | 348/308 |
| 2009/0160989 A1* | 6/2009 | Lauxtermann ............... | 348/308 |
| 2009/0180014 A1* | 7/2009 | Noda et al. .................... | 348/308 |
| 2009/0284632 A1* | 11/2009 | Onuki et al. ................. | 348/302 |
| 2010/0053398 A1* | 3/2010 | Yamashita .................... | 348/302 |
| 2010/0091157 A1* | 4/2010 | Yamashita et al. ............ | 348/300 |
| 2011/0007196 A1* | 1/2011 | Yamashita et al. ............ | 348/294 |

FOREIGN PATENT DOCUMENTS

| | | |
|---|---|---|
| EP | 2175639 A2 | 4/2010 |
| JP | 07-075026 | 3/1995 |
| JP | 09-200617 | 7/1997 |
| JP | 2002-010143 | 1/2002 |

(Continued)

OTHER PUBLICATIONS

Japanese Office Action for Japanese counterpart application No. 2009-185534 dated Feb. 19, 2013.

(Continued)

*Primary Examiner* — Nicholas Giles
*Assistant Examiner* — Abdelaaziz Tissire
(74) *Attorney, Agent, or Firm* — Dentons US LLP

(57) ABSTRACT

A solid-state image pickup device includes a plurality of pixels and a scanning unit. Each pixel includes a photoelectric conversion element and a charge accumulation region. The scanning unit is configured to read a first signal from a charge accumulation region. The scanning unit is configured to read a second signal from the charge accumulation region. The first signal corresponds to an accumulation of signal charges during a first period, while the second signal corresponds to another accumulation of signal charges during a second period.

9 Claims, 9 Drawing Sheets

(56) References Cited

FOREIGN PATENT DOCUMENTS

| | | |
|---|---|---|
| JP | 2002-064751 | 2/2002 |
| JP | 2002-077737 | 3/2002 |
| JP | 2006-033453 | 2/2006 |
| JP | 2008-252195 | 10/2008 |
| JP | 2009-059852 | 3/2009 |
| JP | 2009-147049 | 7/2009 |

OTHER PUBLICATIONS

Extended European Search Report for EP counterpart application No. EP 10008105 dated Jan. 14, 2013.

Japanese Office Action issued in connection with related Japanese Patent Application No. JP 2009-185534 dated Sep. 10, 2013.

* cited by examiner

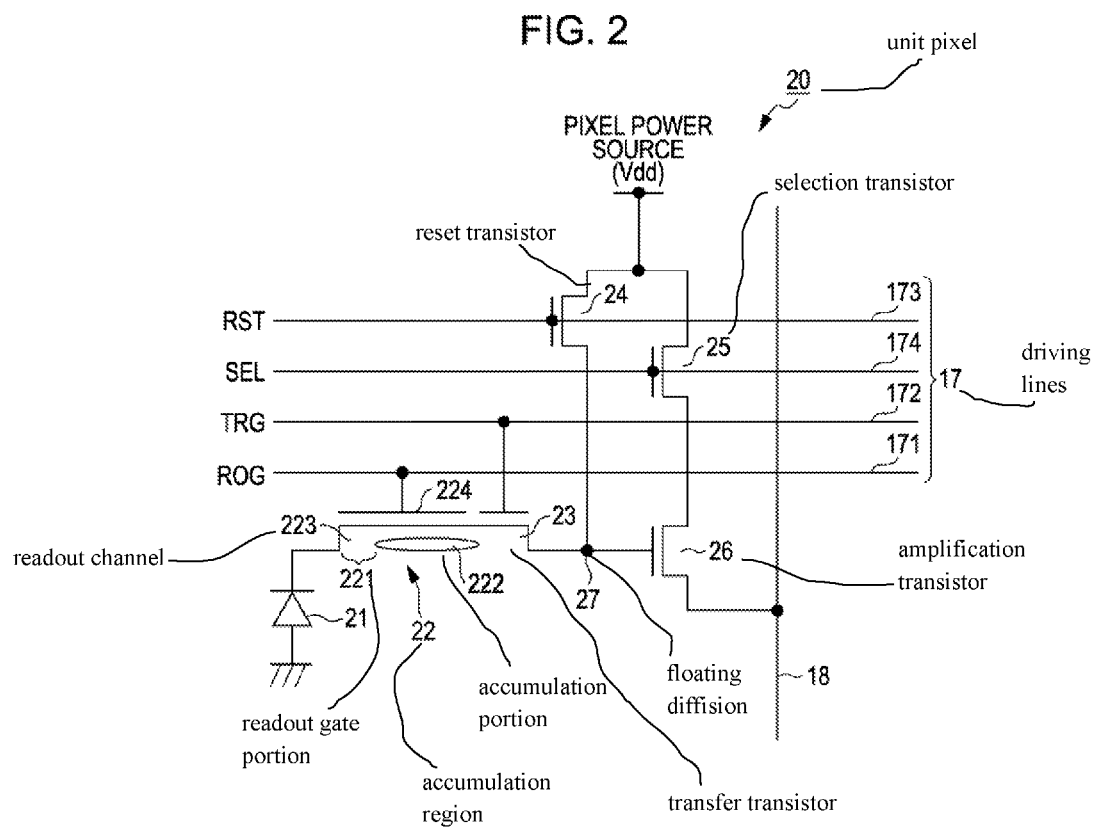

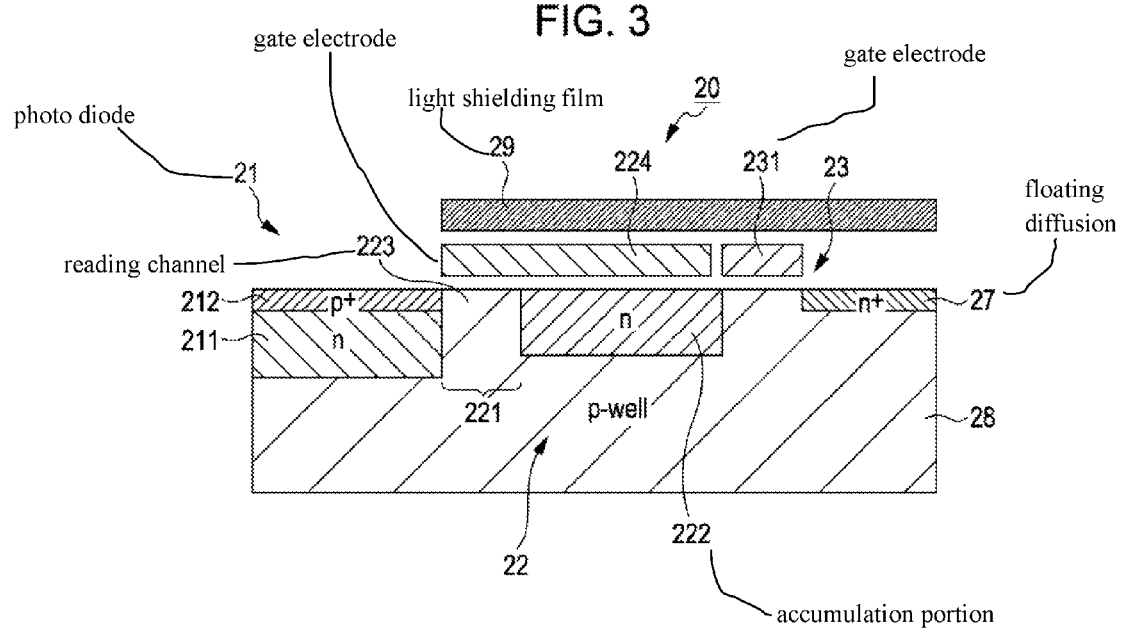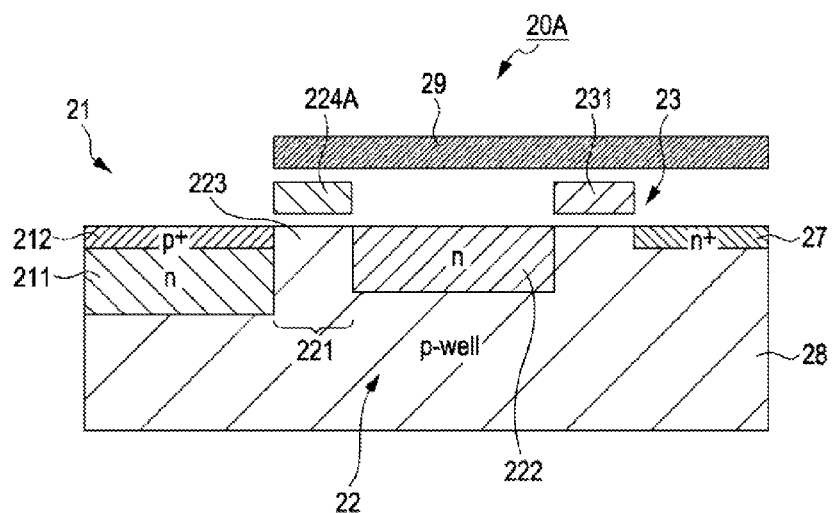

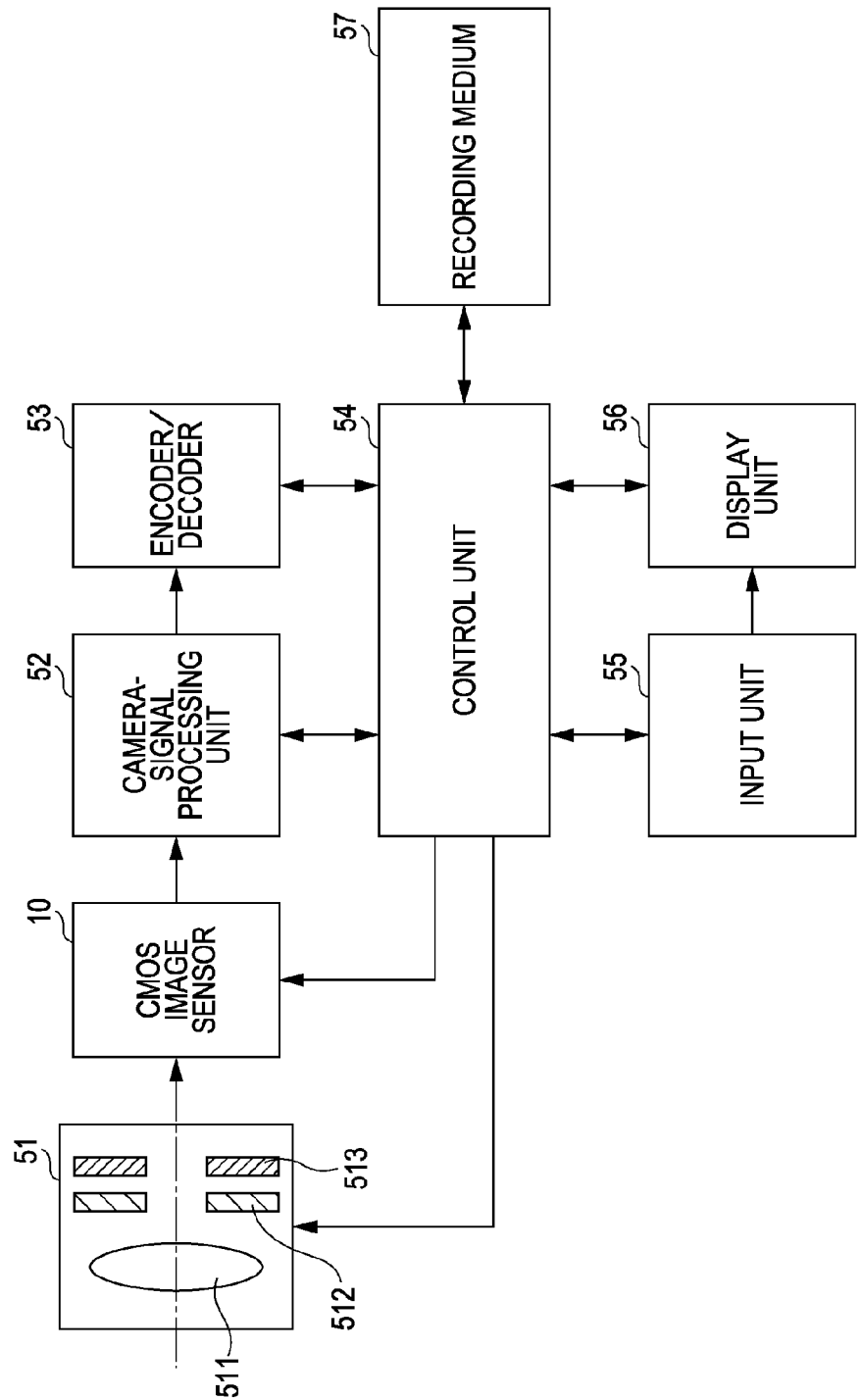

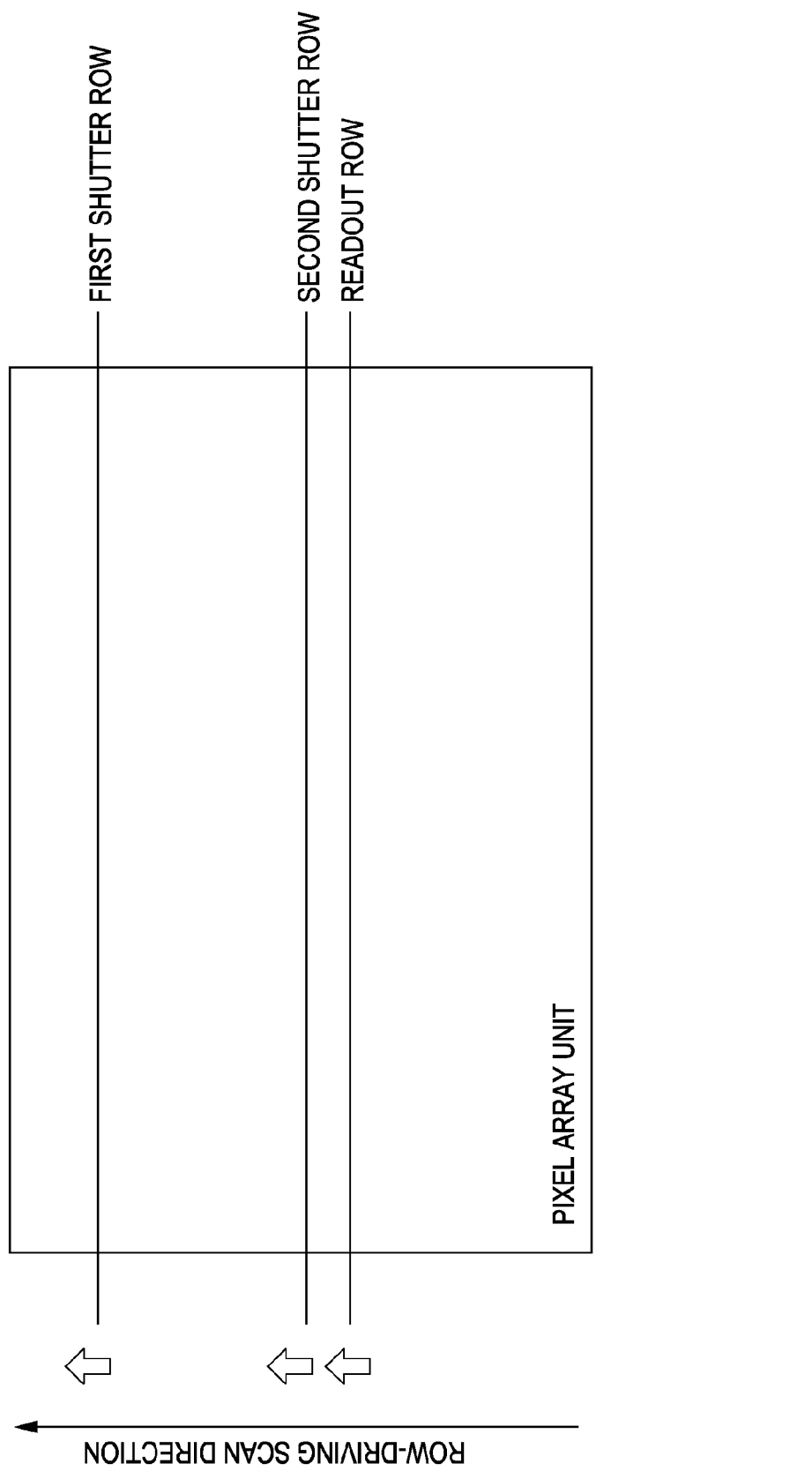

SOLID-STATE IMAGE PICKUP DEVICE WITH PLURAL TRANSFER STRUCTURES TO TRANSFER CHARGE TO PLURAL ACCUMULATION PORTIONS

RELATED APPLICATION DATA

The present application claims priority to and contains subject matter related to that disclosed in Japanese Priority Patent Application JP 2009-185534 filed in the Japan Patent Office on Aug. 10, 2009, the entire content of which is hereby incorporated by reference.

BACKGROUND OF THE INVENTION

The present invention relates to a solid-state image pickup device, a method of driving the solid-state image pickup device, and an electronic apparatus using such a solid-state image pickup device.

In a solid-state image pickup device, a substantially linear output signal is obtained from a unit pixel with respect to the amount of charge accumulated by photoelectric conversion. A dynamic range of the solid-state image pickup device is uniquely determined by a noise level as well as the quantity of charge which can be accumulated in the unit pixel (saturated charge quantity). That is, the lower limit of the output level of the solid-image pickup device is limited with the noise level and the upper limit thereof is limited with the saturation level. As a result, the dynamic range of the solid-state image pickup device is uniquely determined by the saturated charge quantity and the noise level.

In order to extend the dynamic range, the following technique has been generally employed. That is, a wider dynamic range of the solid-state image pickup device has been attained by combining signals of different sensitivities together, for example combining an image having a comparatively clear low-luminance part taken by a long-time charge accumulation and an image having a comparatively clear high-luminance part taken by a short-time charge accumulation.

As a technology to obtain signals of different sensitivities, two or more unit pixels adjacent to each other are combined into a group so as to correspond to one pixel in an output image while the unit pixels in the group are provided with different sensitivities (see, for example, Japanese Unexamined Patent Application Publication No. 2005-065082).

However, the technology disclosed in Japanese Unexamined Patent Application Publication No. 2005-065082 a plurality of unit pixels in combination is designed to correspond to one pixel to obtain signals with different sensitivities. Thus, a decrease in resolution of an output image may occur in comparison with one in which unit pixels on an imaging surface correspond one-on-one to pixels of the output image.

In addition, there is another technology in which two or more signals with different sensitivities can be obtained from the same pixel (one pixel) while being read from two or more rows at different timing on row-scanning (see, for example, Japanese Unexamined Patent Application Publication No. 2003-198948).

However, in a first example in Japanese Unexamined Patent Application Publication No. 2003-198948, a plurality of signals with different sensitivities is output at different timing points in a row-scanning movement from one pixel. Thus, a frame memory is desired for synchronization of the signals with different sensitivities, while causing increases in size and cost of the device. In addition, in a second example in the above patent document, there is a disadvantage in that a reset noise is placed on a preceding signal because a reset level is output after output of the preceding signal from one pixel.

SUMMARY OF THE INVENTION

Disclosed herein are one or more inventions that provide a solid-state image pickup device, a method of driving such a solid-state image pickup device, and an electronic apparatus using such a solid-state image pickup device, where signals with different sensitivities can be obtained from one image without using any frame memory and without overlap of a reset signal on a preceding output signal.

According to an embodiment of the present invention, there is provided a method for controlling a solid-state image pickup device. The method includes reading a first signal from a charge accumulation region. The first signal corresponds to an accumulation of signal charges during a first period. The method further includes reading a second signal from the charge accumulation region. The second signal corresponds to another accumulation of signal charges during a second period. The first time period is from a time of performing a first shutter operation to a time of performing a second shutter operation. The second time period is from the time of performing the second shutter operation to a time occurring before or during a period of scanning a read row.

According to one embodiment, a solid-state image pickup device has a plurality of pixels and a scanning unit. Each pixel includes a photoelectric conversion element and a charge accumulation region. The scanning unit is configured to read a first signal from the charge accumulation region. The scanning unit is also configured to read a second signal from the charge accumulation region. The first signal corresponds to an accumulation of signal charges during a first period, while the second signal corresponds to another accumulation of signal charges during a second period. The first time period is from a time of performing a first shutter operation to a time of performing a second shutter operation. The second time period is from the time of performing the second shutter operation to a time occurring before or during a period of scanning a read row.

According to an embodiment, an electronic apparatus includes a solid-state image pickup device. The solid-state image pickup device includes a plurality of pixels and a scanning unit. Each pixel includes a photoelectric conversion element and a charge accumulation region. The scanning unit is configured to read a first signal from the charge accumulation region. The scanning unit is also configured to read a second signal from the charge accumulation region. The first signal corresponds to an accumulation of signal charges during a first period. The second signal corresponds to another accumulation of signal charges during a second period. The first time period is from a time of performing a first shutter operation to a time of performing a second shutter operation. The second time period is from the time of performing the second shutter operation to a time occurring before or during a period of scanning a read row.

In a still-image pickup operation using a mechanical shutter, light is incident on the photoelectric conversion parts through the mechanical shutter. The photoelectric conversion parts of all of the unit pixels are reset simultaneously in an open state of the mechanical shutter. The first transfer mechanism transfers the charges of the optical conversion parts to the first accumulation portions in all of the unit pixels simultaneously. The unit pixels in the pixel array unit are selected from each row in order in a closed state of the mechanical shutter. The first signal is read to the signal line by the second transfer mechanism and the read-out mechanism, and the second signal is read to the signal line by the first transfer mechanism, the second transfer mechanism, and the read mechanism, while scanning. At this time, the exposure period of the first signal corresponds to a period from simultaneously resetting all of the pixels to transferring charges to the first accumulation portions simultaneously in all of the pixels. In addition, the exposure period of the second signal corresponds to a subsequent period of closing the mechanical shutter. Therefore, first and second signals with different sensitivities and different exposure periods can be obtained from one unit pixel. Thus, the simultaneity of exposure periods of all the pixels can be ensured.

According to embodiments of the present invention, a plurality of signals with different sensitivities can be obtained from one image without using any frame memory and without overlap of a reset signal on a previously output signal. In addition, the simultaneity of exposure periods of all the pixels can be ensured in a still-image pickup operation.

BRIEF DESCRIPTION OF THE DRAWINGS

FIG. 2 is a circuit diagram illustrating an exemplary configuration of a unit pixel;

FIG. 3 is a cross-sectional diagram schematically illustrating the configuration of the unit pixel having a charge accumulating region;

FIG. 4 is a cross-sectional diagram schematically illustrating the configuration of the unit pixel as a modified example of the embodiment;

FIG. 5 is a block diagram illustrating an exemplary configuration of the image pickup device according to the embodiment of the present invention;

FIG. 6 is a schematic diagram illustrating a row scanning with a rolling shutter;

DESCRIPTION OF THE PRESENTLY PREFERRED EMBODIMENTS

Hereinafter, modes for carrying out the present invention (hereinafter, also referred to as "embodiments") will be described with reference to the attached drawings. The embodiments will be described in the following order:

1. Solid-state image pickup device according to an embodiment of the present invention is applied (example of CMOS image sensor)

1-1. System configuration 1-2. Pixel configuration

2. Advantageous features of embodiments of the present invention

3. Electronic apparatus of embodiment (example of image pickup device)

3-1. Configuration of system 3-2. Video mode 3-3. Still-image mode 3-4. Operation and effect of present embodiment <Solid-State Image Pickup Device According to Embodiment of the Present Invention>

[1-1. System Configuration]

Figure 1:
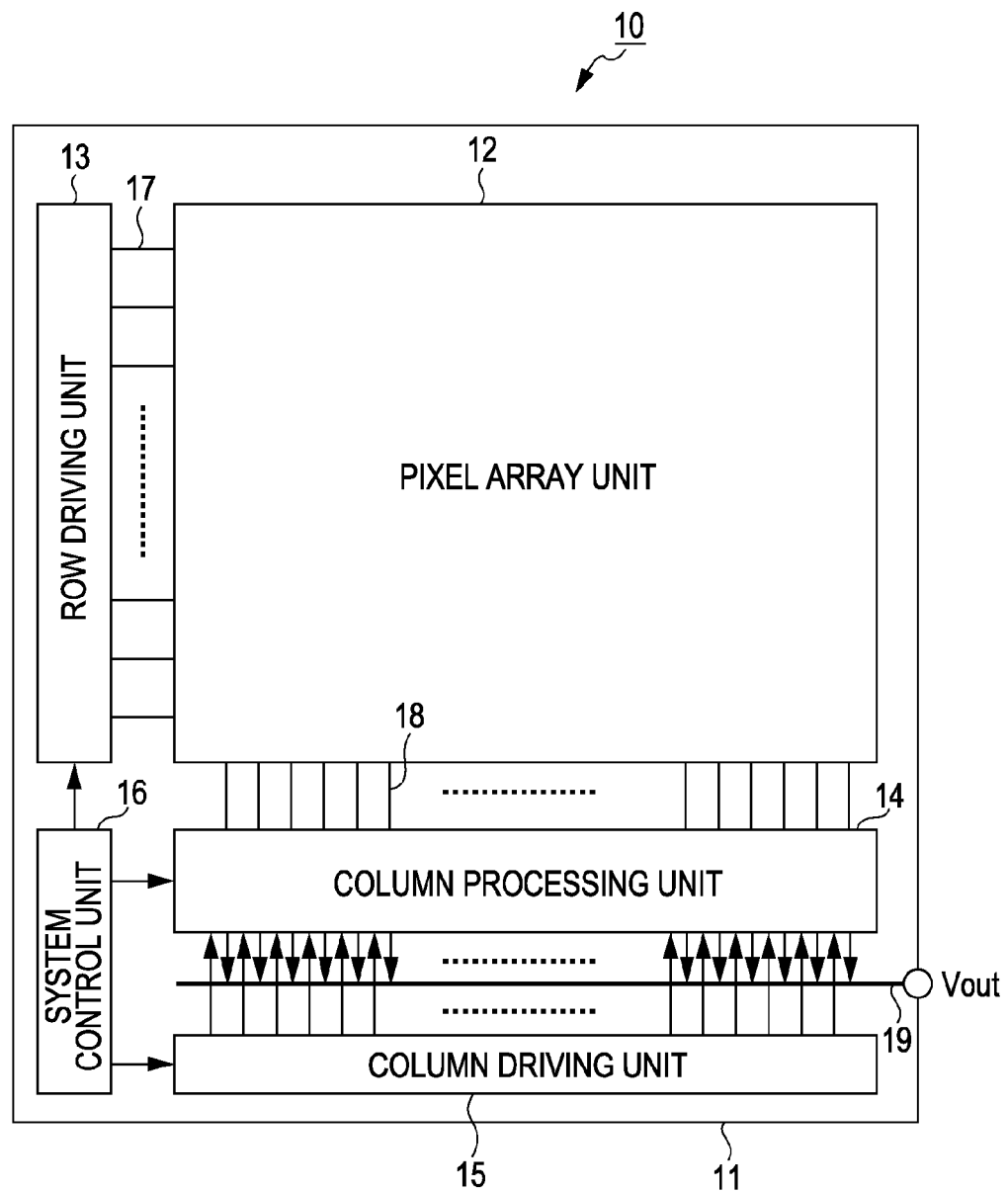
FIG. 1 is a schematic diagram illustrating the system configuration of a CMOS image sensor according to an embodiment of the present invention.

FIG. 1 is a diagram schematically illustrating the system configuration of a CMOS image sensor, which is one of X-Y address-type solid-state image pickup devices, as an example of a solid-state image pickup device according to an embodiment of the present invention. Here, the term "CMOS image sensor" used herein means an image sensor produced by application of a CMOS process or partial application thereof.

The CMOS image sensor 10 of the present embodiment includes a pixel array unit 12 formed on a semiconductor substrate 11 and a peripheral circuit section integrated on the same semiconductor substrate 11. The peripheral circuit section may include, for example, a row scanning unit 13, a column processing unit 14, a column scanning unit 15, and a system control unit 16.

The pixel array unit 12 includes unit pixels (hereinafter, each of which will be also simply referred to as a "pixel") being arranged in two-dimensional matrix form. Here, the unit pixel includes a photoelectric conversion element that carries out photoelectric conversion of incident visible light to generate signal charges (photo charges) with a charge content corresponding to the intensity of light received, and then accumulates the charges in the photoelectric conversion element. The details of the unit pixel will be described later.

In the pixel array unit 12, with respect to the pixel arrangement in matrix form, pixel driving lines 17 for the respective pixel rows are arranged in the row direction (the direction along the pixel arrangement on the pixel row) and vertical signal lines 18 for the respective pixel columns are arranged in the column direction (the direction along the pixel arrangement on the pixel column). The pixel driving line 17 transmits a driving signal for reading a signal from the pixel. In FIG. 1, each pixel driving line 17 is represented as a single wiring line. Alternatively, it may be a combination of two or more wiring lines. The end of the pixel driving line 17 is connected to the output terminal of each row of the row scanning unit 13.

The row scanning unit 13 includes a shift register, an address decoder, and the like and serves as a pixel driving unit that simultaneously drives all the pixels, drives the pixels every row at a time, or drives pixels in another manner in the pixel array unit 12. In general, the row scanning unit 13 may include two scanning systems, a read-scanning system and a sweep-scanning system, but the details thereof will be omitted in the following description.

The read-scanning system selectively scans the unit pixels of the pixel array unit 12 in sequence every row to read out signals from the respective unit pixels. The signal read from the unit pixel is an analog signal. The sweep-scanning system performs a read-scanning movement on the read row, preceded by a sweep-scanning movement by the time corresponding to a shutter speed.

The sweep-scanning movement performed by the sweep-scanning system can sweep undesired charges from the photoelectric conversion element of the unit pixel on the read row to reset the photoelectric conversion element. Then, the sweeping of undesired charges by the sweep-scanning system (i.e., resetting) causes so-called electronic shuttering. Here, the term "electronic shuttering" as used herein refers to the operation of the photoelectric conversion element in which photo charges are thrown away and exposure (accumulation of photo charges) is then newly performed.

A signal read by the reading of the read-scanning system corresponds to the amount of incident light after the reading or the electronic shuttering carried out just before the reading operation of the read-scanning system. Then, a period from the read-timing of the last reading or the sweep-timing of the electronic shuttering to the read-timing of the reading at this time is defined as an accumulation period (exposure period) of photo charges in the unit pixel.

Signals output from the unit pixels on the selectively scanned pixel row by the row scanning unit 13 can be supplied to the column processing unit 14 via the vertical signal lines 18, respectively. For each pixel column of the pixel array unit 12, the column processing unit 14 performs predetermined signal processing on the signal output from each pixel on the selected row via the vertical signal line 18. Then, the column processing unit 14 temporarily stores the pixel signal after the signal processing.

Specifically, the column processing unit 14 receives the pixel signal and then performs signal processing, such as noise removal with correlated double sampling (CDS), signal amplification, and analog-digital (AD) conversion, on such a signal. The noise removal processing removes a fixed pattern noise inherent in the pixel, such as reset noise and a variation in threshold of amplification transistor. Here, the signal processing exemplified herein is only provided for illustrative purposes. Thus, the signal processing is not limited to this example.

The column scanning unit 15 includes a shift register, an address decoder, and the like and sequentially selects unit circuits corresponding to the pixel rows of the column processing unit 14. A pixel signal by which signal processing was carried out by column processing unit 14 is outputted in order to level bus 19 by selection scan by this column scanning unit 15, and is transmitted to the exterior of semiconductor substrate 11 through the level bus 19 concerned by it.

The system control unit 16 receives a clock signal from outside the semiconductor substrate 11, data for instructing an operation mode, and the like. In addition, the data, such as the internal information of the present CMOS image sensor 10, is output. Furthermore, the system control unit 16 includes a timing generator that generates various kinds of timing signals. The system control unit 16 controls driving of the peripheral circuit section including the row scanning unit 13, the column processing unit 14, the column scanning unit 15, and the like based on various kinds of timing signals generated from the timing generator.

[1-2. Pixel Configuration]
(Circuitry)

FIG. 2 is a circuit diagram illustrating an exemplary configuration of the unit pixel. As shown in FIG. 2, for example, a unit pixel 20, which is a configuration example of the unit pixel, includes a charge accumulating region 22, a transfer transistor 23, a reset transistor 24, a selection transistor 25, and an amplification transistor 26 as well as the photoelectric conversion element, such as a photodiode 21.

Here, for example, an N-channel MOS transistor is used as each of the transfer transistor 23, the reset transistor 24, the selection transistor 25, and the amplification transistor 26. However, a combination of conductivity types of transfer transistor 23, reset transistor 24, selection transistor 25, and amplification transistor 26 which are exemplified herein is only provided for illustrative purposes and the combination of conductivity types is thus not limited to such a combination.

To the unit pixel 20, four driving wiring lines, a read line 171, a transfer line 172, a reset line 173, and a selection line 174, are provided as the pixel driving lines 17 and are commonly wired to each pixel on the same pixel column. Read line 171, transfer line 172, reset line 173, and selection line 174 are connected to output terminals corresponding to each pixel column of the column scanning unit 15. The row scanning unit 13 outputs a readout pulse ROG, a transfer pulse TRG, a reset pulse RST, and a selection pulse SEL, which are driving signals for driving the pixel 20, to the read line 171, the transfer line 172, the reset line 173, and the selection line 174, respectively.

The anode electrode of the photodiode 21 is connected to a negative-side power supply (e.g., ground) and photo-electrically converts received light into photo charges (here, photo electrons) with the quantity of charge depending on the amount of the received light, followed by accumulating the photo charges. On the side of the cathode electrode of the photodiode 21, a charge accumulating region 22 is formed.

The charge accumulating region 22 includes a read gate portion 221 and an accumulation portion 222. The read gate portion 221 includes a readout channel 223 and a gate electrode 224 mounted thereon. A readout pulse ROG, which is at a high level (e.g., Vdd level) and becomes active (hereinafter, referred to as "high active"), is applied to the gate electrode 224 from the row scanning unit 13 via the read line 171. Since the readout pulse ROG is applied to the gate electrode 224, the read gate portion 221 reads out signal charges accumulated in the photodiode 21.

The accumulation portion 222 serves as a floating diffusion region and then accumulates (holds) signal charges read from the photodiode 21 by the read gate portion 221. Here, the gate electrode 224 of the read gate portion 221 is not only formed on the read channel 223 but also extended over the accumulation portion 222. In other words, the charge accumulation region 22 employs the configuration of a charge coupled device (CCD). That is, charges can be transferred by changing the potential of the accumulation portion 222 and/or by changing the potential of the read channel 223 when a readout pulse ROG is applied to the gate electrode 224.

The transfer transistor 23 is connected to the charge accumulating region 22 and the gate electrode of the amplification transistor 26. In addition, the gate electrode of the transfer transistor 23 is connected to the transfer line 172. A node 27 electrically connected to both the charge accumulating region 22 and the gate electrode of the amplification transistor 26 is referred to as a floating diffusion (FD) portion. The gate electrode of the transfer transistor 23 is provided with a high-active transfer pulse TRG from the row scanning unit 13 via the transfer line 172. The transfer transistor 23 is brought into an ON state in response to the transfer pulse TRG and then transfers signal charges temporally accumulated in the accumulation portion 222 to the FD portion 27.

The gate electrode of the reset transistor 24 is connected to the reset line 173, the drain electrode thereof is connected to a pixel power source Vdd, and the source electrode thereof is connected to the FD portion 27. The gate electrode of the reset transistor 24 receives a high-active reset pulse RST from the row scanning unit 13. The reset transistor 24 is brought into an ON state in response to the reset pulse RST and removes the charges from the FD portion 27 to the pixel power source Vdd, thereby resetting the FD portion 27.

The gate electrode of the selection transistor 25 is connected to the selection line 174 and the drain electrode thereof is connected to the pixel power source Vdd. A high active selection pulse SEL is applied from the row scanning unit 13 to the gate electrode of the selection transistor 25 via the selection line 174. The selection transistor 25 is brought into an ON state in response to the selection pulse SEL and then applies a voltage from the pixel power source Vdd to the drain electrode of the amplification transistor 26, thereby bringing the amplification transistor 26 into an active state (state in which the unit pixel 20 is being selected).

The gate electrode of the amplification transistor 26 is connected to the FD portion 27, the drain electrode thereof is connected to the source electrode of the selection transistor 25. The source electrode of the amplification transistor 26 is connected to the vertical signal line 18.

The amplification transistor 26 serves as an input section of a source follower circuit, and a read circuit provided for reading a signal obtained by photoelectric conversion in the photodiode 21. In other words, the source electrode of the amplification transistor 26 is connected to the vertical signal line 18 to form a source follower circuit with a power source (not shown) connected to the end of the vertical signal line 18.

In the circuit example of the present embodiment, the selection transistor 25 is designed to be connected between the pixel power source Vdd and the drain electrode of the amplification transistor 26. Alternatively, the selection transistor 25 may be designed to be connected between the source electrode of the amplification transistor 26 and the vertical signal line 18.

Furthermore, the configuration of the unit pixel 20 is not limited to one with four transistors: the transfer transistor 23, the reset transistor 24, the selection transistor 25, and the amplification transistor 26. Alternatively, for example, the unit pixel 20 may be constructed of three transistors without the selection transistor 25, where the selection of pixels can be performed by switching the voltage of the pixel power source Vdd. The configuration of the pixel circuit is not limited to any particular construction.

(Cross-Section Structure)

FIG. 3 is a schematic cross-sectional view of part of the solid-state image pickup device, illustrating a cross-sectional structure thereof from the photodiode 21 to the FD portion 27. In FIG. 3, the same reference symbols as in FIG. 2 are used to denote similar or corresponding portions.

The photodiode 21 includes a first conductive type (e.g., n-type) region 211 formed on a second conductive type (e.g., p-type) well 28 and a reverse conductive (second conductive) type (e.g., p+-type) region 212 is formed on the top of the n-type region 211. The photodiode 21 serves as a buried photodiode where photoelectrons are stored.

The charge accumulating region 22 includes a read channel 223 on the near side from the photodiode 21 and an n-type floating diffusion region on the far side from the photodiode 21. A gate electrode 224 is formed on both the read channel 233 and the accumulation portion 222. The accumulation portion 222 accumulates (holds) signal charges read (transmitted) from the photodiode 21 by the read gate portion 221. The concentration of impurities in the floating diffusion region that serves as the accumulation portion 222 is comparable with the n-type region 211 of the photodiode 21 and enough to be completely depleted.

The gate electrode 231 of the transfer transistor 23 adjoins the accumulation portion (floating diffusion region) 222 of the charge accumulating region 22. A transfer pulse TRG is applied to the gate electrode 231 and charges are then transmitted from the accumulation portion 222 to the FD portion 27. The FD portion 27 is formed of an (n+)-region, a region with a higher electron density than the accumulation portion 222. All of the regions except for the photodiode 21 is shaded with a light-shielding film 29, such as one made of tungsten.

Here, the charge accumulating region 22 is formed of a CCD and has no contact portion through a transfer pathway from the photodiode 21 to the FD portion 27 via the floating diffusion region 222. Therefore, since the photodiode 21 is an embedded photodiode and the charge accumulating portion 22 is formed of a CCD, complete transfer of charges can be realized while the remains of the transfer can be hardly generated in the transfer pathway from the photodiode 21 to the FD portion 27 via the floating diffusion region 222.

In the present pixel structure, the gate electrode 224 also extends over the floating diffusion region 222 on the charge accumulating region 22. Alternatively, as shown in FIG. 4, a unit pixel 20A may be formed so that a gate electrode 224A is only formed on the read channel 221. In this way, even if the unit pixel 20A having such a structure is employed, the charges can be transferred from the photodiode 21 to the accumulation portion 222 by an increase in potential of the read channel 223 when a transfer pulse TRG is applied to the gate electrode 224A.

In the configuration (structure) of the unit pixel 20 as described above, the accumulation portion 222 of the charge accumulating region 22 is defined as a first accumulation portion and the FD portion 27 is defined as a second accumulation portion. Furthermore, the charge accumulating region 22 includes a first transfer mechanism that transfers charges from the photodiode 21 to the accumulation portion 222 (first accumulation portion).

The transfer transistor 23 includes a second transfer mechanism that transfers charges from the accumulation portion 222 to the FD portion 27 (second accumulation portion). The reset transistor 24 includes a reset mechanism that resets the FD portion 27. The amplification transistor 26 includes a read mechanism that reads a signal to the vertical signal line 18 according to the charges in the FD portion 27.

(Global Shutter)

As described above, the unit pixel 20 includes the charge accumulating region 22 for temporally accumulating (holding) signal charges between the photodiode 21 and the FD portion 27. The formation of such a charge accumulating region 22 on the unit pixel 20 may be performed using any of known technologies (see, for example, Japanese Unexamined Patent Application Publication No. 11-177076).

In the CMOS image sensor 10 where the unit pixel 20 includes the charge accumulating region 22, an electronic shutter for all unit pixels (global shutter) can be realized without using any mechanical shutter by simultaneously reading photoelectrically-converted signal charges on all the pixels and then accumulating the charges in the charge accumulating region 22. In addition, the signal charges temporally accumulated in the charge accumulating region 22 can be read in order from each pixel row by the scanning movement of the row scanning unit 13.

(Unsatisfactory Matters of Unit Pixel Having Charge Accumulating Region)

The unit pixel 20 having the charge accumulating region 22 may have an unsatisfactory matter. That is, after reading the signal charges from the photodiode 21 to the charge accumulating region 22, the charge accumulating region 22 is filled with charges from the photodiode 21 and the quantity of charge previously held in the charge accumulating region 22 may change.

For example, if the amount of light is almost equal to one that fills up the photodiode 21 at an exposure time (accumulation time) of slightly longer than $1/1000$ seconds, the exposure time may be set to $1/1000$ seconds. Then, the signal charges, which have been subjected to photoelectric conversion in the photodiode 21, are read and accumulated in the charge accumulating region 22 for all the pixels at a time. After that, for example, if it takes a longer time of about 1/15 seconds to sequentially read signal charges in the charge accumulating region 22 by the row scanning, then the charges from the photodiode 21 can be continuously overflown to the charge accumulating region 22.

In addition, the formation of the charge accumulating region 22 in the unit pixel 20 leads to an increase in pixel size as much as the size of the charge accumulating region 22. If the size of the pixel is almost equal to one without the presence of the charge accumulating region 22, the photodiode 21 may be reduced in size as much as the size of the charge accumulating region 22. In this case, a decrease in dynamic range may be caused unsatisfactory.

<2. Advantageous Features of Embodiment of the Present Invention>

In the solid-state image pickup device according to the embodiment of the present invention, such as a CMOS image sensor, the unit pixel 20 includes a charge accumulating region 22 and is designed to allow the image-pickup surface of the CMOS image sensor to receive incident light through the mechanical shutter. Then, the global shutter is realized by the mechanical shutter, while a dynamic range can be increased using the charge accumulating region 22.

That is, the present embodiment overcomes a problem of light-shielding in which all the regions except for the photodiode 21 in the unit pixel 20 should be completely shielded from light when the mechanical shutter is not employed and attains an increase in dynamic range while realizing a global shutter.

Here, the CMOS image sensor in which unit pixels are two-dimensionally arranged in matrix to detect electric charges as a physical quantity in response to the amount of visual light has been described as an example of the present embodiment. However, the present embodiment is not limited to such a CMOS image sensor. Alternatively, the present embodiment may be applied to any of all the X-Y address type solid-state image pickup devices in which the unit pixel 20 includes the charge accumulating region 22. Furthermore, the solid-state image pickup device may be formed in an on-chip structure or may be formed in a module structure having an image-pickup function, where an image-pickup unit is combined with a signal processing unit or an optical system in a package. Furthermore, the solid-state image pickup device of the present embodiment can be used as an image pickup device in a digital still camera, a video camera, or the like or an image-capturing unit (photoelectric conversion unit) in an electronic apparatus, such as a mobile terminal device having an image-pickup function, such as a cell phone.

<3. Electronic Apparatus According to an Embodiment of the Present Invention>

[3-1. System Configuration]

Next, an electronic apparatus according to an embodiment of the present invention, where the solid-state image pickup device of the above embodiment is used in combination with a mechanical shutter, will be described. Here, an image pickup device, such as a digital still camera, will be described as an example of the electronic apparatus.

FIG. 5 is a block diagram illustrating an exemplary configuration of the image pickup device according to the embodiment of the present invention. As shown in FIG. 5, the image pickup device of the present embodiment includes an optical block 51, a camera signal-processing unit 52, an encoder/decoder 53, a control unit 54, an input unit 55, a display unit 56, and a recording medium 57 in addition to the aforementioned CMOS image sensor 10.

The optical block 51 includes a lens 511 for concentrating light from a subject to the CMOS image sensor 10, an aperture 512 for adjusting the amount of light, a mechanical shutter 513 for selectively incorporating light. Furthermore, the shutter operation with the mechanical shutter 513 can realize a global shutter at the time of a still-picture imaging mode.

Furthermore, the optical block 51 possesses a lens-driving mechanism for moving a lens 511 to carry out focusing and zooming, an iris mechanism for controlling an aperture 12, a mechanical shutter mechanism for driving a mechanical shutter 513, and so on. These mechanism parts are driven in response to control signals from the control unit 54.

The CMOS image sensor 10 is an X-Y address type solid-state image pickup device and performs timing controls of exposure, signal-reading, reset, and the like of the aforementioned unit pixel 20 in response to control signals from the control unit 54.

The camera signal-processing unit 52 carries out camera-signal processing, such as white-balance adjustment and color correction, on image signals output from the CMOS image sensor 10 under the control of the control unit 54.

The encoder/decoder 53 operates under the control of the control unit 54 and performs compression-coding processing with a predetermined still image data format, such as JPEG (Joint Photographic Coding Experts Group) format.

In addition, the encoder/decoder 53 performs extension-decoding processing on the coding data of a still image supplied from the control unit 54. In the encoder/decoder 53, the compression encoding/extension-decoding processing is allowed to be performed with MPEG (Moving Picture Experts Group) format or the like.

The control unit 54 may be, for example, a microcontroller with a central processing unit (CPU), a read only memory (ROM), a random access memory (RAM), or the like. Furthermore, the control unit 54 performs overall control on each part of the image pickup device by executing a program stored in the ROM or the like.

The input unit 55 may include various kinds of operation keys, levers, and dials, such as a shutter release button, and output various kinds of control signals to the control unit 54 in response to input, such as that received in association with a user's operation.

The display unit 56 may include a display device, such as a liquid crystal display (LCD), and an interface circuit for the LCD. Among image signals supplied from the control unit 54, the display unit 56 generates image signals to be displayed on the display device. Subsequently, the display unit 56 supplies the generated image signals to the display device and allows the display device to display an image. The recording medium 57 may be a portable semiconductor memory, an optical disc, a hard disk drive (HDD), a magnetic tape, or the like. The recording medium 57 receives an image data file encoded by the encoder/decoder 53 from the control unit 54 and then stores the image data file. In addition, the recording medium 57 reads data specified based on a control signal from the control unit 54 and then outputs the data to the control unit 54.

In the above description, the image pickup device has been exemplified by the digital still camera, but not limited to the digital still camera. Alternatively, the present embodiment is applicable to all the image devices each having a mechanical shutter for selectively incorporating incident light from a photographic subject. Furthermore, the image pickup device may be one in the form of a module (i.e., a camera module) to be mounted on an electronic apparatus having an image-pickup function.

[3-2. Video Mode]

The operation of a digital still camera as an image pickup device having the above configuration in a video mode, such as a monitoring mode, will be described with reference to a pixel circuit thereof shown in FIG. 2.

In a video mode, such as a monitoring mode, signal charges are read from the photodiode 21 by shuttering in an asynchronous relationship between the pixel rows with a deviation in accumulation time for each row, or rolling shutter operation that determines the start and end of exposure for each pixel row. FIG. 6 is a schematic diagram illustrating row scanning at this time. The row scanning unit 13 performs a row-scanning movement so that a first shutter row, a second shutter row, and a read row can be sequentially scanned in this order in relation shown in FIG. 6. Here, an interval between the first shutter row and the second shutter row (interval between timing points of scanning) is long, while an interval between the second shutter row and the read row is short.

Figure 7:
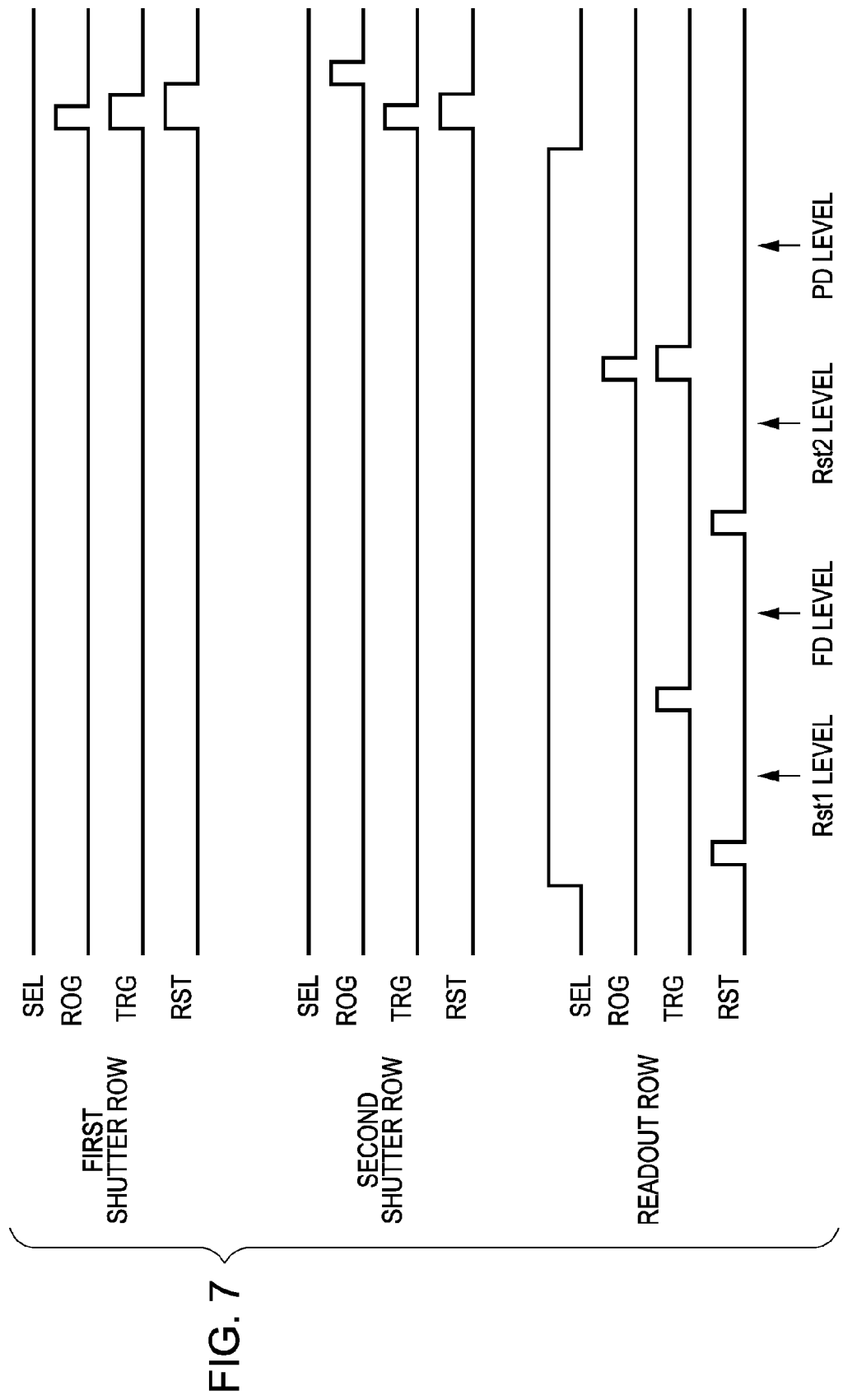
FIG. 7 is a timing chart representing drive timing during a 1H period in video mode.

FIG. 7 is a diagram illustrating drive timing during 1H period (period in which a scanning movement remains in one row). The first shutter row brings a read pulse ROG, a transfer pulse TRG, and a reset pulse RST into an active state (high level) and then brings these pulses ROG, TRG, and RST into a non-active state (low level) in this order. Therefore, the photodiode 21 and the charge accumulating region 22 of each pixel on the first shutter row are reset. After the reset operation, the accumulation of photoelectrons is newly started in the photodiode 21.

The second shutter row brings a transfer pulse TRG, and a reset pulse RST into active state (high level) and then brings these pulses TRG and RST into a non-active state (low level) in this order to reset the accumulation portion 222 of the charge accumulating region 22 at first. Next, the read pulse ROG is brought into an active state to transfer charges from the photodiode 21 to the accumulation portion 222 of the charge accumulating region 22. The charges to be transferred at this time are those subjected to photoelectric conversion during the period from the timing of scanning the first shutter row to the timing of scanning the second shutter row.

On the read row, a selection pulse SEL is brought into an active state to select a pixel. During the period of keeping the selection pulse SEL in an active state, at first, the FD portion 27 is reset by bringing a reset pulse RST into an active state. A signal corresponding to the voltage of the FD portion 27 at the time of reset is brought into a first reset level (hereinafter, referred to as a "Rst1 level", followed by being supplied to the column processing unit 14 from the amplification transistor 26 via the vertical signal line 18.

Next, the transfer pulse TGR is brought into an active state to transfer photoelectrons from the accumulation portion 222 of the charge accumulating region 22 to the FD portion 27. The photoelectrons at this time are signals during the period from the timing of scanning the first shutter row to the timing of scanning the second shutter row. A signal corresponding to the voltage of the FD portion 27 at the time of transferring the photoelectrons is defined as one at a first signal level (hereinafter, also referred to as an "FD level") and then supplied from the amplification transistor 26 to the column processing unit 14 via the vertical signal line 18.

Subsequently, the reset pulse RST is brought into an active state again to reset the FD portion 27 again. A signal corresponding to the voltage of the FD portion 27 at the time of the second reset is defined as one at a second reset level (hereinafter, also referred to as an "Rst2 level") and then supplied from the amplification transistor 26 to the column processing unit 14 via the vertical signal line 18. Subsequently, both a read pulse ROG and a transfer pulse TRG are brought into an active state and the read pulse ROG is then brought into a non-active state to transfer photoelectrons from the photodiode 21 to the FD portion 27 through the charge accumulating region 22. The photoelectrons to be transferred at this time may be signals during the period from the timing of scanning the second shutter row to the timing of scanning the read row. For example, the signals may be accumulated during a time of performing a second shutter operation to a time occurring before or during a period of scanning a read row. Subsequently, a signal corresponding to the voltage of the FD portion 27 at this time is defined as one at a second signal level (hereinafter, also referred to as a "PD level") and then supplied from the amplification transistor 26 to the column processing unit 14 via the vertical signal line 18.

The column processing unit 14 carries out arithmetic processing that calculates a difference between the FD level and the Rst1 level and a difference between the PD level and the Rst2 level, which are supplied via the vertical signal line 18. The signal obtained by the former arithmetic processing is defined as a FD signal, and one obtained by the latter is defined as a PD signal. In this case, the FD signal is responsible for a long accumulation time from the timing of scanning on the first shutter row and the timing of scanning on the second shutter row. Therefore, this FD signal is a signal of high sensitivity. On the other hand, a PD signal is responsible for a short accumulation time, such as from a time of scanning the second shutter row to a time of scanning the read row. The short accumulation time may be from a time of performing a second shutter operation to a time occurring before or during a period of scanning a read row. Therefore, this PD signal is a signal of low sensitivity.

Subsequently, both the high-sensitivity signal and the low-sensitivity signal are subjected to synthetic processing to obtain a signal with a wide dynamic range. This synthetic processing may be carried out in the column processing unit 14. Alternatively, the synthetic processing may be carried out in an output circuit part formed in the output stage of the chip (semiconductor substrate 11 of FIG. 1) or the signal processing unit (camera signal-processing unit 52 of FIG. 5) on the outside of the chip.

(Synthesis Processing for Wide Dynamic Range)

Figure 8:
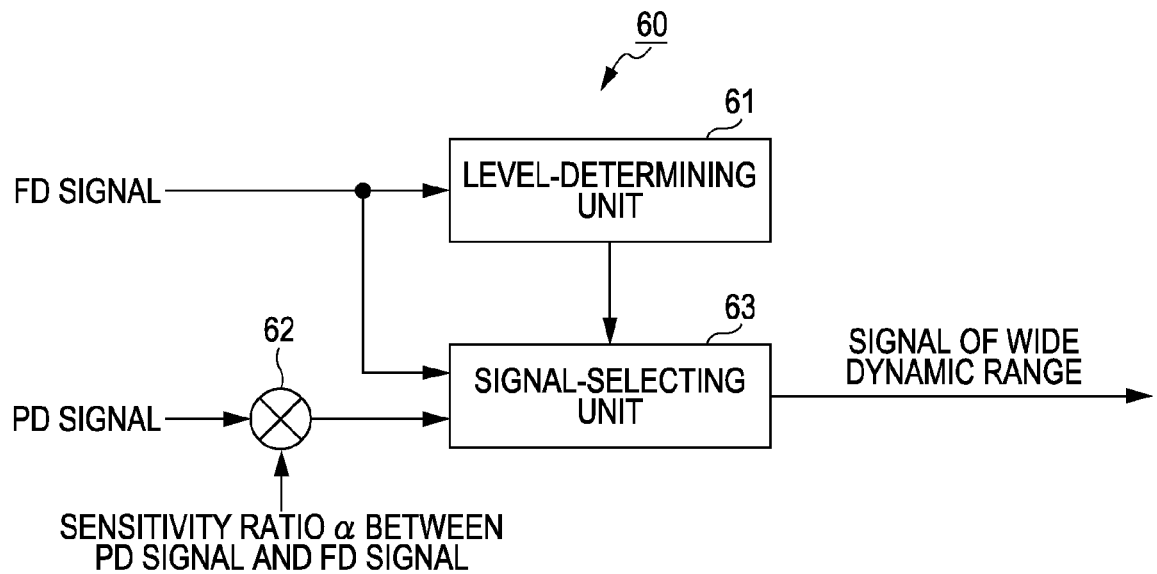
FIG. 8 is a block diagram illustrating an exemplified configuration of a signal processing unit that performs synthetic processing for obtaining a wide dynamic range.

Here, an example of the synthetic processing for wide dynamic range. FIG. 8 is a diagram illustrating the configuration of a synthetic processing section 60 for obtaining a wide dynamic range.

The synthetic processing section 60 includes a level-determining unit 61, a multiplier unit 62, and a signal-selecting unit 63. The level-determining unit 61 is responsible for level determination to make a comparison between a FD signal (first signal) and a reference level to determine whether the FD signal is at a saturation level or at a level near the saturation level where the poor linearity of the signal is observed. The multiplier unit 62 multiplies a PD signal (second signal) with the sensitivity ratio $\alpha$ between the PD signal and the FD signal.

The sensitivity ratio $\alpha$ can be obtained from a ratio between the interval between the second shutter row that determines an exposure period for PD signal and the first shutter row that determines an exposure period for FD signal.

The signal-selecting unit 63 employs two inputs, the FD signal and the output signal from the multiplier unit 62. The signal-selecting unit 63 selects one of these two inputs based on the determination result of the level-determining unit 61 and then generates a signal of wide dynamic range. Specifically, the signal-selecting unit 63 selects the output signal from the multiplier unit 62 (i.e., PD signal×sensitivity ratio $\alpha$) in the case that the FD signal is at a saturation level or at a level near the saturation level where the poor linearity of the signal is observed, or selects the FD signal for other cases.

Thus, the "PD signal×sensitivity ratio α" is selected when the FD signal is at a saturation level or at a level near the saturation level where the poor linearity of the signal is observed. If the FD signal is smaller than the reference level, then the FD signal is used without modification to carry out the synthetic processing for obtaining a signal of wide dynamic range. The synthetic processing section 60 can realize the synthetic processing by simple signal processing as described above. Thus, the circuit structure can be minimized. Therefore, the synthetic processing section 60 can be easily mounted on the column processing unit 14 with a restricted space.

Here, if the signal-selecting unit 63 simply selects one of the "PD signal×sensitivity ratio α" and the FD signal, an undesirable level difference in signals, so-called solarization, may occur near the boundary between the "PD signal×sensitivity ratio α" and the FD signal. To prevent such a level difference between the signals, the process for weighted averaging is performed so that the FD signal can be weighted on the side of the smaller signal near the boundary and the "PD signal×sensitivity ratio α" can be weighted on the side of the larger signal near the boundary.

For example, if the sensitivity ratio α is equal to four (α=4), then the level of the PD signal may be magnified four times because the level of the PD signal is one fourth of the level of the FD signal. A synthesis signal obtained by the process of weighted averaging can be represented by the following equation:

$$\text{Synthesis signal} = \text{FD signal} \times \beta + \text{PD signal} \times \alpha \times (1-\beta)$$

wherein β is a coefficient.

Figure 9:
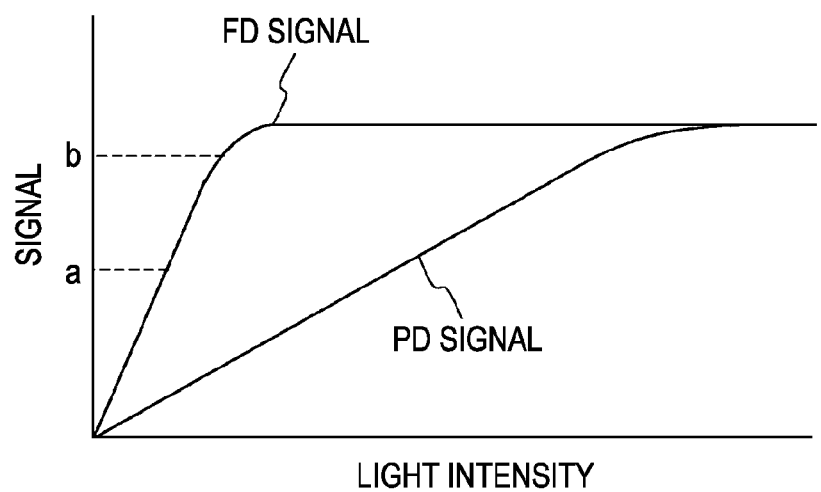
FIG. 9 is a diagram illustrating the relationship between the light intensity and the signal level with respect to each of FD and PD signals.

FIG. 9 is a diagram illustrating the relationship between the light intensity and the signal level with respect to each of the FD signal and the PD signal. In FIG. 9, the level "a" is a reference level (second reference level) for determining whether the FD signal is small and set to, for example, almost the half of the saturation level. In addition, the level "b" is a reference level (first reference level) for determining whether the FD signal is at a saturation level or at a level near the saturation level where the poor linearity of the signal is observed.

Figure 10:
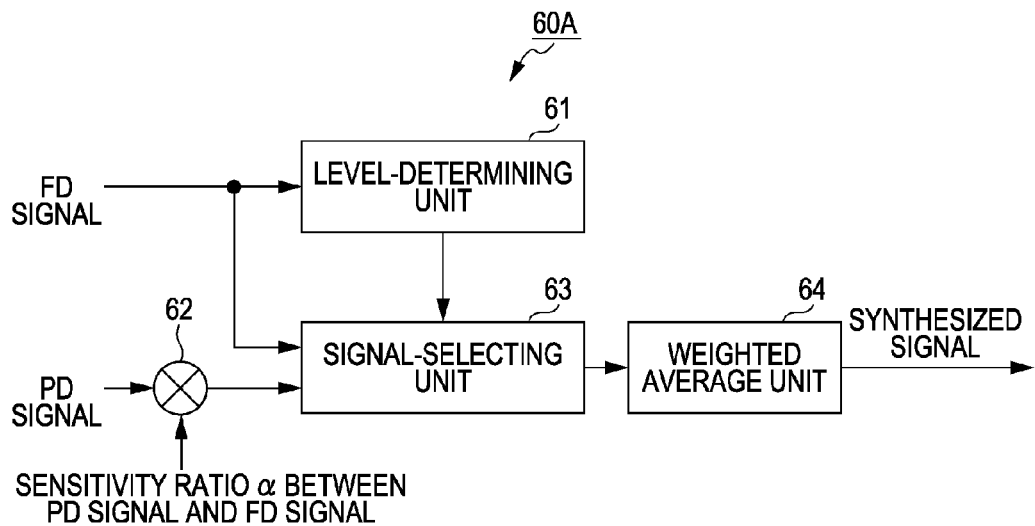
FIG. 10 is a block diagram illustrating another example of the configuration of the signal processing unit that performs synthetic processing for obtaining a wide dynamic range.

The weighted average processing as described above is realizable by forming a weighted average part 64 in the latter part of the signal-selecting unit 63, as shown in FIG. 10. Specifically, for example, such a weighted average part 64 is included in a synthetic processing section 60A and determines a value of coefficient β based on the level of the FD signal to carry out the above arithmetic processing.

Figure 11:
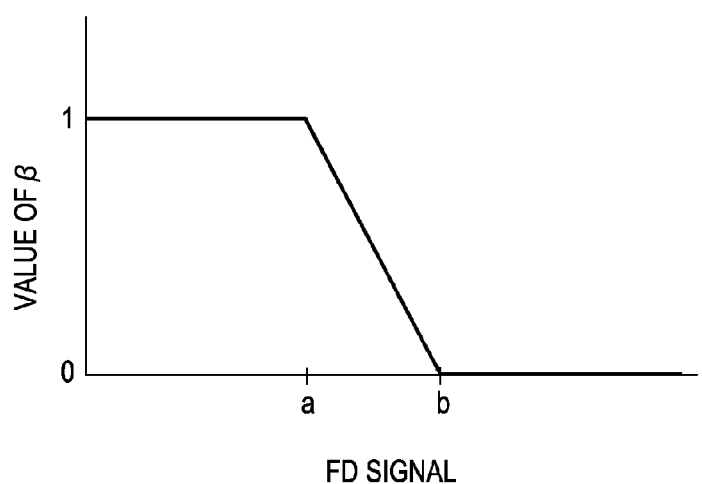
FIG. 11 is a diagram illustrating an exemplified relationship between the FD signal and the coefficient β of weighted average.

FIG. 11 is a diagram graphically illustrating an example of the relationship between the FD signal and the value of coefficient β. If the FD signal is not higher than the reference level "a", then the value of coefficient β is set to 1 (one). If the FD signal is not smaller than the reference level "b", or it is at a saturation level or at a level near the saturation level where the poor linearity of the signal is observed, then the value of coefficient β is set to 0 (zero). If the level of the FD signal can be represented by a<FD signal<b, then the value of coefficient β is linearly changed from 1 to 0 based on the level of the FD signal.

Depending on the set value of coefficient β as described above, the weighted average processing can be represented as follows:

(1) if FD signal≤a, then synthesis signal=FD signal;
(2) if b≤FD signal, then synthesis signal=PD signal×sensitivity ratio α; and
(3) if a<FD signal<b, then synthesis signal=FD signal×β+PD signal×α×(1−β).

By performing the weighted average processing as described above, the "PD signal×sensitivity ratio α" and the FD signal can be connected smoothly. Thus, any level difference between the signals at the boundary between the "PD signal×sensitivity ratio α" and the FD signal can be substantially avoided. The synthetic processing with the synthetic processing section 60 or 60A is not only applicable to a video but also to a still image as described later.

The pixel row on which the above operation is carried out is sequentially selected by the row scanning unit 13 and a rolling shutter operation is then performed. Thus, signals with different sensitivities can be obtained from one image without using any frame memory and without overlap of a reset signal on a previously output signal. In addition, the synthetic processing of signals with different sensitivities, or high sensitivity signals and low sensitivity signals, can be carried out to extend the dynamic range of the CMOS image sensor 10.

In particular, by obtaining signals having different sensitivities from one pixel, a decrease in resolution of an output image can be prevented. In other words, each unit pixel on the image-pickup surface has a one-to-one relationship with each pixel of the output image. A combination of two or more unit pixels adjacent to each other is made corresponding to one pixel of the output image. Therefore, there is no decrease in resolution of an output image in contrast to any technology in which signals with different sensitivities are obtained from the combination of two or more unit pixels.

Here, it is more preferable that a FD signal to be read at first may be of a long exposure compared with that of a PD signal to be read subsequent to the FD signal. This is because, if the PD signal to be read subsequent to the FD signal is of a long exposure, a change in charge content in the accumulation portion 222 occurs as a result of the overflow of charges from the photodiode 21 to the charge accumulating region 22 when a large amount of light is introduced into the photodiode 21 within the period of the long exposure.

Therefore, the interval between the first shutter row and the second shutter row is extended, while the interval between the second shutter row and the read row is shortened. Therefore, it becomes possible to prevent the overflow of charges from the photodiode 21 to the accumulation portion 222 during the latter interval in which charges are retained in the accumulation portion 222. Furthermore, if the PD signal to be read after the FD signal is of a short exposure, then the transfer of charges from the photodiode 21 to the FD portion 27 via the charge accumulating region 22 can be easily performed because of a smaller amount of charges to be transferred.

Strong light enough to cause the overflow of the photodiode 21 within a short interval between the timing of scanning the second shutter and the timing of scanning the read row may be also satisfied because even the PD signal can be detected as being saturated. Therefore, the longer and shorter periods of exposure are set in that order. That is, since the FD signal to be read before the PD signal is set to a signal of longer exposure than the PD signal to be read after the FD signal, it is not commonly desired to provide a pixel with an additional bus for allowing the charges overflowed from the photodiode to move to another place.

Furthermore, in the charge accumulating region 22, it is preferable that the read pulse ROG to be applied to the gate electrode 224 may be of a negative voltage of −1 V or the like on the Low side thereof. By setting the Low side of the read pulse ROG to a negative voltage, electron holes can be generated in the interface and thus the generation of dark current from the interface can be prevented.

[3-3. Still Image Mode]

Next, the operation of the image pickup device according to the present embodiment at the time of a still image mode will be described with reference to the pixel circuit shown in FIG. 2. There is a case in which a moving object may be unwillingly distorted in a still image. Thus, it is demanded to secure the simultaneous exposure of the respective pixels. In this embodiment, the simultaneous exposure is secured using a shutter operation with a mechanical shutter. In addition, it is noted that the charge accumulating region 22 is not provided for realizing a global shutter operation but for extending a dynamic range.

Figure 12:
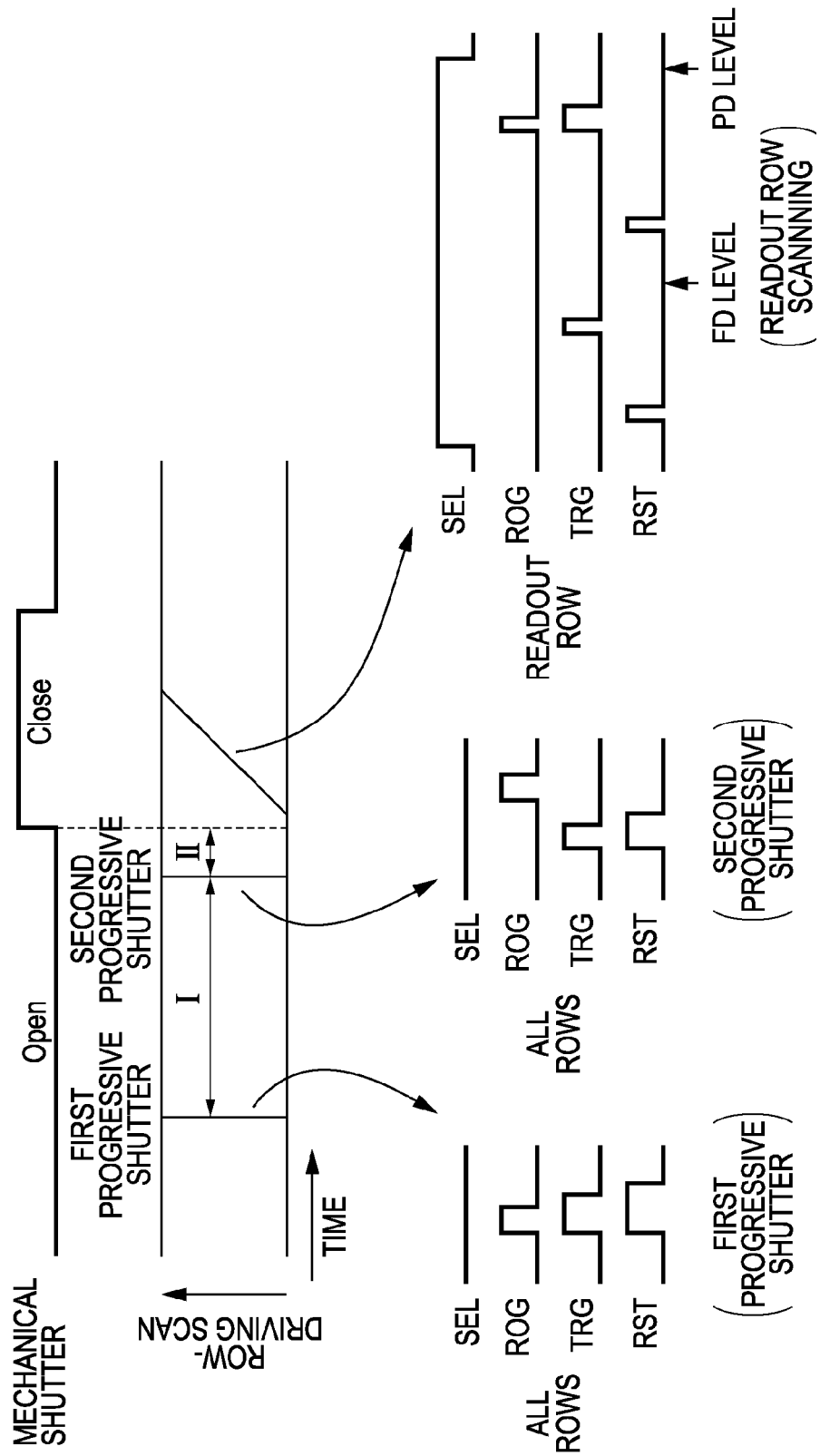
FIG. 12 is a diagram illustrating the operation in a still-image mode.

FIG. 12 is an operational diagram illustrating a concrete example of the operation at the still image mode. First, the first combined shutter operation is carried out in an exposure period in which a mechanical shutter 513 (see FIG. 5) arranged in an incident light path to the CMOS image sensor 10 is being opened ("Open"). In this first combined shutter operation, for all the pixel rows, a read pulse ROG, a transfer pulse TRG, and a reset pulse RST are brought into an active state. Then, simultaneously for all the pixels, these pulses ROG, TRG, and RST are brought into a non-active state in this order to reset the accumulation portion 222 of the charge accumulating region 22. Here, driving all the pixels in a completely simultaneous manner may cause a drop in power supply or the like. Thus, for example, such an operation may be performed on a plurality of pixel rows (e.g., every ten rows) within a short time to perform the operation on the respective pixels in a substantially simultaneous manner. Hereinafter, "all the pixels simultaneously" also means such a case.

Next, a second shutter operation is performed. In this second combined shutter operation, a transfer pulse TRG and a reset pulse RST are brought into an active state and then these pulses TRG and RST are brought into a non-active state in this order to reset the FD portions 27 of all the pixels simultaneously. Then, after the reset pulse RST is brought into an inactive state, the read pulse ROG is brought into an active state to transfer charges from the photodiodes 21 of all the pixels simultaneously to the accumulation portion 222 of the charge accumulating region 22. Here the charges are those accumulated in the photodiode 21 within a predetermined period ("I" in FIG. 12).

Next, the mechanical shutter 513 is brought into a closed state ("Close") to terminate the exposure period. At this time, photoelectrons are accumulated in the photodiode 21 for a predetermined period ("II" in FIG. 12). Here, the period "II" is shorter than the period "I". Then, the row scanning unit 13 performs a scanning movement on the read row of the pixel array unit.

The same operation as that of the video mode is carried out on the read row. Specifically, during the period in which the selection pulse SEL is in an active state, the reset pulse RST is brought into an active state to reset the FD portion 27 and a Rst1 level is then read. Next, the transfer pulse TGR is brought into an active state. Then the transfer transistor 23 transfers photoelectrons from the accumulation portion 222 of the charge accumulating region 22 to the FD portion 27 to read a FD level.

Next, the reset RST is brought into an active state to reset the FD portion 27 again, followed by reading a Rst2 level. Subsequently, both the read pulse ROG and the transfer pulse TRG are brought into an active state and the read pulse ROG and the transfer pulse TRG are then brought into a non-active state to transfer photoelectrons from the photodiode 21 to the FD portion 27 to read a PD level. Therefore, a set of the FD level and the Rst1 level and a set of the PD level and the Rst2 level can be supplied to the column processing unit 14, respectively.

In a manner similar to the video mode, signal processing is carried out in the column processing unit 14 to determine a difference between the FD level and the Rst1 level and a difference between the PD level and the Rst2 level. If the former is defined as a FD signal and the latter is defined as a PD signal, the FD signal is a high sensitive signal having a long period (I) from the timing of the first combined shutter operation to the timing of the second combined shutter operation. On the other hand, the PD signal is a low sensitive signal having a short period (II), such as from the timing of scanning the second shutter row to the timing of scanning the read row. The short period may be from a time of performing a second shutter operation to a time occurring before or during a period of scanning a read row. Then, the synthetic processing is performed to combine the high-sensitive FD signal and the low-sensitive PD signal to obtain a signal with a wide dynamic range.

Here, it is more preferable that a FD signal to be read at first may be of a long exposure compared with that of a PD signal to be read subsequent to the FD signal. This is because, if the PD signal to be read subsequent to the FD signal is of a long exposure, a change in charge content in the accumulation portion 222 occurs as a result of the overflow of charges from the photodiode 21 to the charge accumulating region 22 when a large amount of light is introduced into the photodiode 21 within the period of the long exposure. Then, the period (I) from the timing of the first combined shutter operation to the timing of the second combined shutter operation may be prolonged, while the period (II) from the timing of the second combined shutter operation to the "Close" of the mechanical shutter 513 may be shortened.

Therefore, the charges can be prevented from overflowing the photodiode 21 to the accumulation portion 222 of the charge accumulating region 22 during the period (II) in which charges are retained in the accumulation portion 222 of the charge accumulating region 22. In addition, if the PD signal to be read after the FD signal is a signal with a shorter period of exposure, a smaller amount of charges can be transferred from the photodiode 21 to the FD portion 27 via the charge accumulating region 22. Therefore, the charges can be more easily transferred from the photodiode 21.

Although charges might overflow from the photodiode 21 during the period (II) from the timing of the second combined shutter operation to the "Close" of the mechanical shutter 513, it is not necessary to consider such a case because the light intensity can be detected not less than the saturation level. Therefore, since the longer and shorter periods of exposure are arranged in this order, or the FD signal to be read before the PD signal is designed as a signal having a longer exposure period than that of the PD signal to be read after the FD signal, an additional bus is not necessarily included in a pixel to escape charges overflowed from the photodiode 21 to another place.

According to the present embodiment, the read column can be scanned while the mechanical shutter 513 is being closed. Thus, any disadvantage found in the technology, such as one disclosed in Japanese Unexamined Patent Application Publication No. 11-177076, in which the unit pixel 20 has a charge accumulating region 22 and a global shutter is realized using such a charge accumulating region 22, can be overcome. In other words, it is possible to avoid a change in amount of charges in the accumulation portion 222 of the charge accumulating region 22 as a result of overflow of charges from the photodiode 21 due to the introduction of light for a long period desired for the read scanning.

[3-4. Operation and Effect of Present Embodiment]

As described above, in the CMOS image sensor 10 in which the unit pixel 20 includes the charge accumulating region 22 between the photodiode 21 and the FD portion 27, the use of the charge accumulating region 22 can extend a dynamic range. Specifically, a plurality of signals with different sensitivities is obtained using the charge accumulating region 22 and the plurality of signals is then subjected to the synthetic processing to obtain a wide dynamic range. Simultaneity in exposure times in a screen at the time of taking a still image can be secured by a shutter operation with the mechanical shutter 513.

Furthermore, in the present embodiment, two or more signals with different sensitivities can be obtained from one unit pixel 20, thereby avoiding a decrease in resolution, which can be found in the case of using two or more pixels to obtain signals with different sensitivities. A frame memory is not necessary for simultaneously generating two or more signals with different sensitivities in such a case that two or more signals with different sensitivities are output from one pixel at different timings of row scanning.

Furthermore, since the signals with different sensitivities are generated from the same pixel, the signals can be subjected to the synthetic processing for attaining a wide dynamic range without an influence of false color due to a spatial displacement or an influence of characteristic variation between pixels when signals from different pixels are used.

In addition, since the charge accumulating region 22 for temporarily accumulating charges is placed between the photodiode 21 and the FD portion 27, the following advantageous effects can be obtained. That is, the Low side of the read pulse ROD to be applied to the gate electrode 224 of the charge accumulating region 22 is set to a negative voltage. Thus, electron holes can be generated on the surface of the charge accumulating region 22 to decrease the generation of dark current from the interface.

Furthermore, the transfer of charges is performed after resetting the FD portion 27. Thus, with respect to each of high and low sensitive signals, the read processing is carried out so that the reset levels Rst1 and Rst2 can be output before the output of the FD and PD levels. Therefore, any reset noise is not placed on a signal which is output in advance from one pixel in contrast to any of existing technologies in which a reset level is output later.

Although described above, the charge accumulating region 22 is not limited to the CCD structure in which the gate electrode 224 is also placed on the floating diffusion region 222. Alternatively, it may be of any configuration (mechanism) which can temporally store the charge the charges read out from the photodiode 21 and then transfer the charges later. Alternatively, furthermore, an additional transfer gate unit and an additional charge accumulating region may be formed. In the charge accumulating region 22, the saturated amount of charges being accumulated in the accumulation portion 222 may be slightly larger than the photodiode 21 to receive the charges from the photodiode 21. Even if the saturated amount of charges being accumulated in the accumulation portion 222 is set to in this manner, the dynamic range can be extended when the ratio of accumulation times is increased "n" folds. For example, the dynamic range can be extended eight folds when the ratio of accumulation times is eight folds. In other words, it is not necessary to provide the accumulation portion 222 with an eight-fold capacity to extend the dynamic range eight folds.

Although the above embodiment has been described using the example in which two signals with different sensitivities, a high sensitivity signal and a low sensitivity signal, are obtained from one unit pixel 20. Alternatively, the present embodiment is also applicable to another example in which a plurality of charge accumulating regions 22 may be formed to obtain three or more different signals from one unit pixel 20.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device, comprising:
   a pixel array unit in which unit pixels are arranged two-dimensionally in matrix, each unit pixel including (a) a photoelectric conversion part that accumulates a charge generated by electric conversion, (b) a first transfer structure that transfers said charge from said photoelectric conversion part to a first charge accumulation portion, (c) a second transfer structure that transfers said charge from said first charge accumulation portion to a second charge accumulation portion, (d) a readout structure that reads out a signal in response to said charge to a signal line and (e) a reset structure that resets said second charge accumulation portion; and
   a row driving unit driving said unit pixel,
   wherein,
   (1) row driving unit is configured such that (a) said first transfer structure transfers said charge stored in said photoelectric conversion part during a first accumulation period to said first charge accumulation portion, (b) said second transfer structure and said readout structure read out a first signal to said signal line in response to said charge of said first charge accumulation portion, and then (c) said first transfer structure, said second transfer structure, and said readout structure read out a second signal to said signal line in response to said charge of said photoelectric conversion part during a second accumulation period,
   (2) light is incident on said photoelectric conversion part through a mechanical shutter,
   (3) said row driving unit resets said photoelectric conversion parts of all of said unit pixels simultaneously in an open state of said mechanical shutter,
   (4) said first transfer structure transfers said charges of said photoelectric conversion parts to said first charge accumulation portions in all of said unit pixels simultaneously,
   (5) said unit pixels in said pixel array unit are selected from each row in order in a close state of said mechanical shutter,
   (6) said first signal is read to said signal line by said second transfer structure and said readout structure, and
   (7) said second signal is read to said signal line by said first transfer structure, said second transfer structure, and said readout structure, while scanning.

2. The solid-state image pickup device according to claim 1, wherein a period from simultaneously resetting all of said pixels to transferring to said first charge accumulation portions simultaneously in all of said pixels is longer than a subsequent period of closing said mechanical shutter.

3. The solid-state image pickup device according to claim 1, wherein a synthetic processing section that performs synthetic processing of said first signal and said second signal which are output through said signal line.

4. The solid-state image pickup device according to claim 3, wherein:
said synthetic processing section employs said second signal×α when said first signal is at a saturation level or not less than a reference level near said saturation level, and employs said first signal when said first signal is not more than said reference level; and
said α is a sensitivity ratio between said first signal and said second signal.

5. The solid-state image pickup device according to claim 3, wherein said synthetic processing part performs weighted average processing on said first signal and a signal obtained by said second signal×α when said first signal is not more than a saturation level or a first reference level near said saturation level or is not less than a second reference level which is smaller than said first reference level.

6. The solid-state image pickup device according to claim 5, wherein said synthetic processing section performs weighted average processing by arithmetic calculation of said first signal×β+said second signal×α×(1−β) wherein β is a coefficient.

7. A solid-state image pickup device, comprising:
a pixel array unit in which unit pixels are arranged two-dimensionally in matrix, each unit pixel including (a) a photoelectric conversion part that accumulates a charge generated by electric conversion, (b) a first transfer structure that transfers said charge from said photoelectric conversion part to a first charge accumulation portion, (c) a second transfer structure that transfers said charge from said first charge accumulation portion to a second charge accumulation portion, (d) a readout structure that reads out a signal in response to said charge to a signal line and (e) a reset structure that resets said second charge accumulation portion; and
a row driving unit driving said unit pixel,
wherein,
(1) said row driving unit is configured such that (a) said first transfer structure transfers said charge stored in said photoelectric conversion part during a first accumulation period to said first charge accumulation portion, (b) said second transfer structure and said readout structure read out a first signal to said signal line in response to said charge of said first charge accumulation portion, and then (c) said first transfer structure, said second transfer structure, and said readout structure read out a second signal to said signal line in response to said charge of said photoelectric conversion part during a second accumulation period;
(2) said row driving unit scans (a) a first shutter row that resets said photoelectric conversion part, (b) a second shutter row that transmits said charge of said photoelectric conversion part to said first charge accumulation portion by said first transfer structure, and (c) a readout row that reads said first signal to said signal line by said second transfer structure and said readout structure and reads a second signal to said signal line by said first transfer structure, said second transfer structure, and said readout structure;
(3) said first shutter row, said second shutter row, and said readout row are scanned in order while a period from timing of scanning said first shutter row to timing of scanning said second shutter row is different from a period from timing of scanning said second shutter row to timing of scanning said readout row
(4) said synthetic processing section employs said second signal×α when said first signal is at a saturation level or not less than a reference level near said saturation level, and employs said first signal when said first signal is not more than said reference level; and
(5) said α is a sensitivity ratio between said first signal and said second signal.

8. The solid-state image pickup device according to claim 7, wherein said synthetic processing part performs weighted average processing on said first signal and a signal obtained by said second signal×α when said first signal is not more than a saturation level or a first reference level near said saturation level or is not less than a second reference level which is smaller than said first reference level.

9. The solid-state image pickup device according to claim 8, wherein said synthetic processing section performs weighted average processing by arithmetic calculation of said first signal×β+said second signal×α×(1−β) wherein β is a coefficient.

* * * * *